Figure 1:
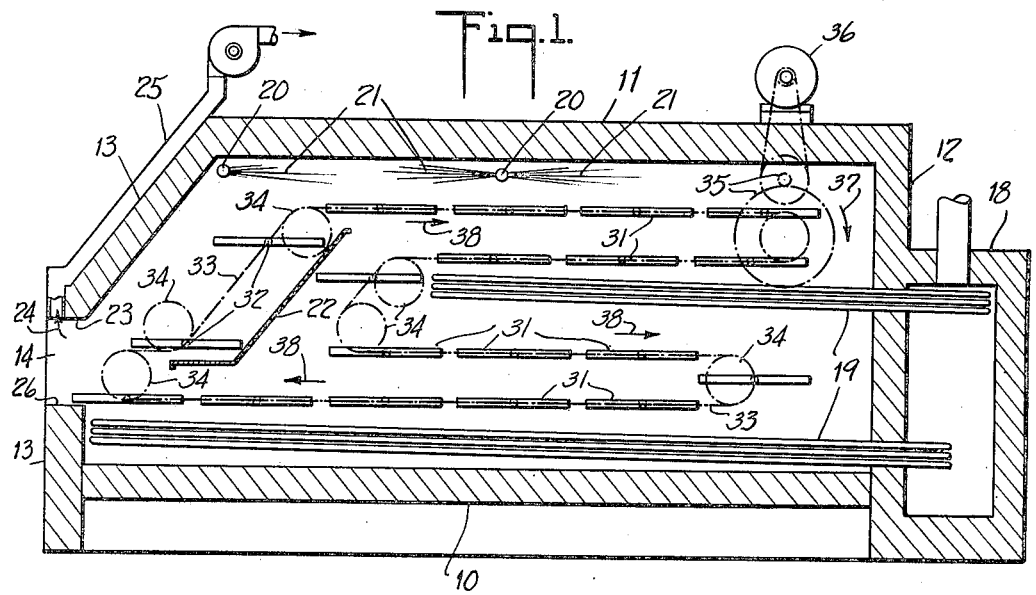

Oct. 8, 1940.  C. GOTTFRIED  2,217,312

BAKING OVEN

Filed May 19, 1939

INVENTOR
CHARLES GOTTFRIED
BY
Gluck & Breitenfeld
ATTORNEYS

Patented Oct. 8, 1940

2,217,312

UNITED STATES PATENT OFFICE 2,217,312

BAKING OVEN

Charles Gottfried, New York, N. Y.

Application May 19, 1939, Serial No. 274,537

5 Claims. (Cl. 107—57)

My present invention relates generally to baking machinery, and has particular reference to improvements in baking ovens.

The type of oven for which my invention is primarily intended involves an endless train of successive trays or hearth plates which are caused to be moved in continuous procession through a baking chamber and past an aperture in a side wall of the oven. The aperture is arranged at a height which permits an operator to have access to the trays for purposes of loading and unloading.

Usually, in ovens of this general type, as indicated in my earlier Patent 2,055,101, the trays are caused to move transversely across the aperture, preferably in an upward direction. When it is borne in mind that the unloading and reloading frequently requires the removal from each tray of as many as nine pans, (containing baked products), and the reloading onto the tray of an equal number of pans containing fresh dough; and that each tray is accessible for little more than one minute, and sometimes less; it will readily be understood that the operator must necessarily work with considerable speed. Since the reloading cannot be effected until the tray has been first unloaded, and since the tray is by this time likely to be approaching pretty close to the upper edge of the aperture, it frequently happens that the operator is unable to load the tray completely.

One way of overcoming this difficulty is to provide for intermittent advancement of the trays so that each tray pauses momentarily in accessible adjacence to the aperture. But such intermittent operation is at the expense of output capaciy. Slowing the speed of travel of the trays, to lengthen the period during which each tray is accessible, is also at the expense of output capacity, because the nature of the baking process requires that each tray remain within the baking chamber for a certain maximum period of time, and no longer.

Nor can the difficulty be feasibly solved by increasing the width of the aperture because conservation of heat and steam within the over requires that the aperture be as narrow as possible. Usually a twenty-four inch width is employed.

Heretofore, the only alternative has been to station two operators at the aperture, so that they can accomplish, between them, the work which one operator alone would have difficulty in completing.

It is a general object of my present invention to provide an improved oven construction in which these difficulties have been overcome in an extremely simple and economical manner. More particularly, it is an object of the invention to arrange the circuit of tray travel in a unique and novel manner, so that each tray, though moving continuously and with no decrease in speed of travel, is nevertheless accessible at the aperture for a materially prolonged period of time. Moreover, in accordance with my invention, this desirable result is capable of accomplishment with an aperture that is not only no wider than the usual aperture, but which may actually be of reduced width, for example, approximately eighteen inches.

In accordance with my invention, an oven may be operated continuously, at maximum capacity, and with minimum loss of heat and steam, under the relatively leisurely control of a single operator.

In an oven of the present improved character, I employ an endless conveyor means of conventional character for moving an endless train of successive trays along a circuit through the oven and past the aperture. The articulation between the conveyor and the hearth plates is of any well known character which maintains the plates always in horizontal positions. The departure from conventional practice resides, however, in the arrangement of the circuit of travel so that it includes a U-shaped loop of travel accessibly adjacent to the aperture. More particularly, I provide a means for moving the trays successively toward and away from accessible adjacence to the aperture, along substantially horizontal paths of travel.

The U-shaped loop of travel is characterized by having the arms of the U substantially horizontal, with the lower arm at the approximate level of the lower edge of the aperture, and the upper arm at an elevated level substantially below the upper edge of the aperture. Preferably, the trays are caused to approach the aperture along the lower arm of said loop, and they are then moved in an upward arc to the upper level, and thence away from the aperture along a substantially horizontal path. In this way, each tray is accessible during the entire period of its travel around the loop, and notwithstanding the use of an aperture no more than approximately eighteen inches in width, each tray is accessible for unloading and reloading purposes for a period more than twice as great as the period of time heretofore available in conventional constructions.

A feature of my invention lies in arranging the loop of travel in such a way that each tray actually projects into the aperture during its travel around the loop. This materially increases the accessibility of the tray.

I achieve the foregoing objects, and such other objects as may hereinafter appear or be pointed out, in the manner illustratively exemplified in the accompanying drawing, wherein—

Figure 2:
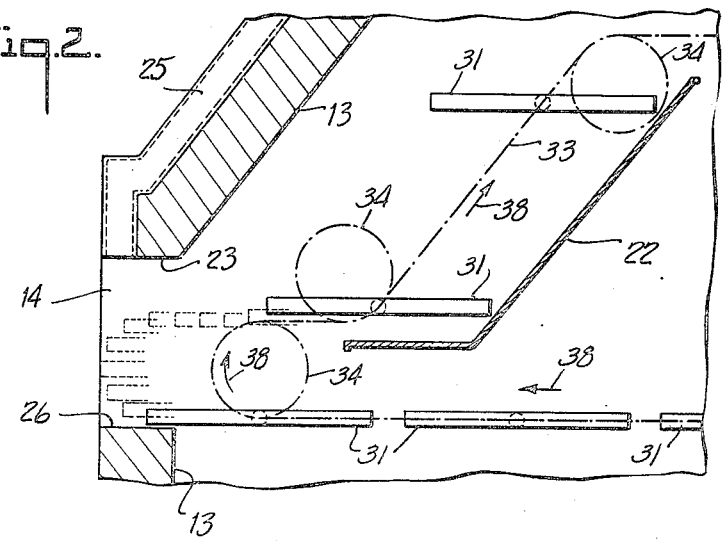

Figure 1 is an elevational cross-sectional view through a baking oven embodying the features of the present invention, certain parts being shown diagrammatically; and Figure 2 is an enlarged fragmentary view of the aperture of this oven, indicating more clearly the movement of each tray at the aperture.

In the drawing, structural supporting elements, such as beams, columns, reinforcements, and the like, are omitted for the sake of clearness. It will be understood however by those skilled in the art, that the oven has a supporting structure formed of suitable angle irons, brackets, and the like, all in accordance with well known practice. The drawing also omits the details of the heating means, and of the construction of the endless conveyor means, since these details form no part of the present invention and are well known per se.

The oven I have chosen to illustrate is a substantially rectangular chamber having a bottom wall or floor 10, a top wall 11, a rear wall 12, and a front wall 13. In the front wall 13 there is a substantially rectangular aperture 14 which may or may not be provided with any suitable type of closure. The upper portion of the wall 13 is preferably inclined rearwardly, as shown.

The oven is of course provided with side walls, so that it is substantially enclosed to define a baking chamber. This chamber may be heated in any conventional way, and I have chosen to illustrate a substantially rectangular fire box 18 built onto the rear wall 12, from which sets of steam tubes 19 project forwardly into the oven. I have shown two such sets of tubes, the upper set being shorter than the lower set, and the latter lying closely adjacent to the floor 10 and extending substantially for the full length of the latter.

Any suitable means such as perforated steam tubes 20, are preferably arranged in the upper portion of the oven so as to spray steam, as indicated at 21. This steam is beneficial to the baking of certain products, such as bread or rolls, and helps to maintain a steamy moist atmosphere in the upper portion of the oven. A baffle 22, arranged behind the inclined upper portion of the wall 13, and preferably at an inclination, as shown, helps to maintain this steamy atmosphere by confining to the oven the moist vapors which naturally rise from the products which are being baked. The excess steam can escape in only one way, and that is down the inside of the inclined wall 13 and out underneath the upper edge 23 of the aperture 14, as indicated by the arrow 24. A conduit or vent 25 withdraws this escaping steam from the aperture, so as to leave the latter freely available for the unloading and reloading operations.

In accordance with my invention, the lower edge 26 of the aperture 14 need be no more than about eighteen inches below the upper edge 23, as compared with the conventional twenty-four inch aperture of ovens of more conventional character. It will be understod, however, that these measurements, in inches, are given merely by way of example, to emphasize the advantage of my present invention in allowing the use of a narrower aperture; and that the invention is by no means restricted to any specific size of oven or aperture.

Within the oven there is an endless conveyor means which may be of any conventional character, and the details have been omitted because they have no direct bearing upon the invention. For example, the conveyor may consist of two linked chains arranged adjacent to the opposite side walls of the oven, with the trays supported between them. These trays or hearth plates have been designated in the accompanying drawing by the reference numerals 31. They are so spaced from one another that when they are travelling in horizontal alignment they are closely adjacent to one another, and since the articulation to the conveyor means is of such a character that it retains the plates in horizontal positions at all times, the plates assume spaced superposed relations when they are travelling in vertical or inclined directions. In an oven in which the aperture is approximately eighteen inches in width, the trays 31 may be arranged at approximately twenty-eight inch intervals, i. e., the distance between the points 32 of Figure 1 would be approximately twenty-eight inches.

The dot-and-dash line 33 represents not only the conveyor means, but also the general nature of the circuit along which the train of trays is moved. Guide rollers 34 are arranged at required intervals along this circuit, and one of them is caused to be driven by a train of gears 35 deriving its power from a driving motor 36, or other suitable source of motive power. The large gear 35 is caused to rotate continuously in the direction of the arrow 37, as a result of which the trays are caused to move continuously in the direction of the arrows 38.

It will be observed that, in the oven illustrated, the trays enter the baking chamber at the front of the oven, moving upwardly into the steamy portion of the oven. They then travel rearwardly along a horizontal path, then forwardly over the upper set of steam tubes 19, then rearwardly again at a lower level, and then forwardly over the lower set of steam tubes 19.

In accordance with my invention, the trays approach the aperture along a substantially horizontal path which is at the approximate level of the lower edge 26 of the aperture. Each tray therefore becomes accessible to the operator even before it has actually reached the aperture, and during this time the operator has a convenient opportunity to unload from the tray the pans of bread or other baked products which have passed through the oven. The forward guide roller 34 defines the forward curved end of a substantially U-shaped loop of travel which each tray thereupon traverses. During this travel, the tray assumes, successively, the positions which are substantially indicated by the dotted lines in Figure 2. It will be observed that the tray swings upwardly through a semicircular arc, during which time the forward portion of the tray projects substantially into the aperture 14. During this time, the operator has an excellent opportunity to complete his unloading, and to commence the reloading of the tray.

The upward swing of the tray brings it ultimately to an elevated level at which the tray starts to move away from the aperture in a rearward direction and along a substantially horizontal line of travel. The elevated level at which this takes place is substantially below the upper edge 23 of the aperture, thereby affording ample and unhurried opportunity for the operator to complete the loading of pans containing fresh dough onto the tray. The tray remains accessible for a considerable period even after it has started to travel back into the oven.

Upon completing its traverse of this U-shaped loop of travel, the tray is guided in an upwardly inclining path which commences the tray's circuitous travel through the oven.

As stated, each tray is thus accessible to the operator during the entire period of its travel around the U-shaped loop. The extent of this loop, including the two horizontal arms thereof, and the semi-circular arc at its forward end, is more than twice as great as the vertical distance through which the ordinary tray would be travelling, in an ordinary oven, during its movement past the aperture. It is this added period of accessibility, which permits the present oven to have a narrower aperture, to be operated continuously, and to be controlled by a single operator. These advantages are increased by the projection of the tray into the aperture to bring the tray into closer range of access; and by the opportunity for the operator to carry out much of the unloading and reloading while the tray is travelling horizontally.

In general, it will be understood that changes in the details, herein described and illustrated for the purpose of explaining the nature of my invention, may be made by those skilled in the art without departing from the spirit and scope of the invention as expressed in the appended claims. It is, therefore, intended that these details be interpreted as illustrative, and not in a limiting sense.

Having thus described my invention, and illustrated its use, what I claim as new and desire to secure by Letters Patent is—

1. In a baking oven having an aperture in a side wall, an endless train of successive trays, and means for moving said train along a circuit which includes a U-shaped loop of travel accessibly adjacent to said aperture, the arms of the U being substantially horizontal, the lower arm being at the approximate level of the lower edge of said aperture, the upper arm being at an elevated level substantially below the upper edge of said aperture, said moving means being constructed for moving the trays toward the aperture along said lower arm and away from the aperture along said upper arm of the U-shaped loop whereby each tray is accessible during the entire period of its travel around said loop.

2. In a baking oven, the combination set forth in claim 1, in which said loop of travel is so arranged with respect to said aperture that the trays project into said aperture during their travel around said loop from one level to the other.

3. In a baking oven having an aperture in a side wall, a series of trays, and means for moving said trays successively toward and away from accessible adjacence to said aperture, along substantially horizontal paths of travel with the path of travel from said aperture arranged above the path of travel toward the aperture and below the upper edge of said aperture.

4. In a baking oven having an aperture in a side wall, a series of trays, and means for moving said trays successively toward and away from accessible adjacence to said aperture, along superposed substantially horizontal paths of travel, the uppermost path moving away from the aperture lying in a plane between the upper and lower edges of said aperture, the other path moving toward the aperture lying in a plane no lower than the lower edge of said aperture.

5. In a baking oven having an aperture in a side wall, a series of trays, and means for moving said trays successively toward and away from accessible adjacence to said aperture, said means advancing each tray to the aperture along a substantially horizontal path at the approximate level of the lower edge of the aperture, then in an upward arc to a level below the upper edge of the aperture, and then away from the aperture along a substantially horizontal path at said elevated level.

CHARLES GOTTFRIED.